Patented Nov. 28, 1939

2,181,369

UNITED STATES PATENT OFFICE 2,181,369

PURIFICATION OF METHYL VIOLET

Orville S. Frank, Chicago, Ill., assignor to The Sherwin-Williams Company, Cleveland, Ohio, a corporation of Ohio No Drawing. Application February 12, 1938, Serial No. 190,234

10 Claims. (Cl. 260—391)

The present invention relates to the manufacture and purification of the dyestuff methyl violet, having the standard identifications as follows:

"Colour Index" (British standard) No. 680
"Schultz" (German and U. S. standard) No. 515

This particular dyestuff as it is currently manufactured for commercial uses is in the form of a salt, such as the hydrochloride or sulphate. It carries bad odors which persist in products which may be made from it. Because of such odors the uses of the dyestuff are limited. For example, it cannot be used in the manufacture of printing inks, or tungstated methyl violet lakes. The characters of the malodorous bodies are not definitely known, and such bodies are most difficult to remove. Ordinary methods of treatment to remove the malodorous bodies fail. For example, the commercial product cannot successfully be treated with steam to steam-distill the bodies, nor can the solid substance be extracted with organic solvent materials which do not dissolve the methyl violet.

The object of the present invention is to provide a successful extraction method to remove odorous bodies, which method may be practiced on the commercial product, and also be embodied in the process of manufacture before attaining the final stage for commercial usage.

Experiments to accomplish this objective have established the fact that the malodorous bodies become so firmly fixed in solid forms of the dyestuff that they resist removal by ordinary means.

It has also been determined that the process or means employed therein must not be so drastic as to affect the character of the dyestuff, or to lower its color value. The color value and shade of the product are of great commercial significance. Because the dyestuff in its process of manufacture, and in its commercial form, is quite sensitive to change by action of chemicals which might otherwise alter or remove the malodorous bodies, the field is quite limited in which to find an agent to effect a selective removal of these bodies.

In general the present invention requires that the dyestuff be dispersed in an aqueous medium as a solution of a soluble salt thereof, and that this solution be extracted with a liquid body which is immiscible with the solution and which is preferably volatile, for dissolution of the malodorous bodies, which liquid is a non-solvent or otherwise incapable of dissolving an appreciable amount of methyl violet from said solution. For example, commercial methyl violet hydrochloride or sulphate may be dissolved in water, then the solution is extracted with a suitable liquid, and the dyestuff then recovered from the solution. Any water soluble salt of the dyestuff in a water solution may be subjected to the same treatment, such as the oxalate, formate, acetate, nitrate, phosphate, etc. A commercial methyl violet hydrochloride or sulphate may be dissolved in water and thus purified, or be treated with alkali to destroy the salt form and provide the free base as an insoluble material, which carries the objectionable odors. This free base may be separated, if desired, and acidified by an appropriate acid to form the corresponding water-soluble salt, using sufficient water to form a solution for such purification. Preferably, however, the purification is carried out as an extra step in the commercial manufacture of methyl violet.

One general type of procedure is used to make methyl violet commercially, but it has many variations in the process as practiced in various plants. In all of them the basic procedure and materials employed give rise to the malodorous bodies. The procedure near the final stages yields a water solution of methyl violet salt, which may contain excess acid over that combined with the methyl violet to form the salt. The presence of excess acid does not interfere with the process of the present invention.

In order indicate the nature of materials and the process which gives rise to such malodorous bodies, and to illustrate how the invention may be applied in the process of manufacture, the following statement of the process is given, taken from "The Society of Dyers and Colourists Color Index", edited by F. M. Rowe, D. Sc., F. I. C., and published by the society at the general offices, 30 Pearl Assurance Buildings, Bradford, Yorkshire, England:

"175 kgm. of common salt and 10 kgm. of finely powdered copper sulphate are mixed intimately and 8 kg. of phenol and 2 liters of water are added. 20 kgm. of dimethylaniline are then added gradually and the mixture is heated at 55° C. for 8 hours. The product is treated with milk of lime to dissolve the phenol and salt and is then filtered. The residue is a double salt of the color base and cuprous chloride and the copper is converted into sulphide with sulphureted hydrogen or with sodium sulphide. Filter, treat the residue with dilute hydrochloride acid, filter off the copper sulphide and salt out the dye from the filtrate. Purify by dissolving in water and salting out. Yield 86%.

"The use of hydrogen sulphide which led to frequent accidents is avoided by—

(a) Boiling the crude insoluble melt with dilute sulphuric acid—filtering and precipitating the coloring matter with sodium sulphate free from chloride. The methyl violet sulphate is then washed carefully, dissolved in water and precipitated as the hydrochloride by the addition of salt.

(b) Alternatively the crude melt is triturated with ferric chloride solution whereby cupric chloride is formed, and the mixture is filtered. The coloring matter is then extracted with water and precipitated by the addition of salt."

From the foregoing it will be clear that a sludge is provided which contains the methyl violet in an association with copper. At this stage it is already accompanied by malodorous bodies. The copper is customarily treated with a form of sulphur to provide copper sulphide, such for example as sodium sulphide or hydrogen sulphide. The copper sulphide is quite insoluble or resistant to dissolution by dilute acids which are capable of forming a water soluble salt of methyl violet to provide a solution thereof separable from copper sulphide. Customarily, dilute hydrochloric acid or dilute sulphuric acid is used to make this separation. This treatment with a sulphur compound seems further to enhance the malodorous character. The resulting salt in solution is then rendered insoluble in the aqueous vehicle by the usual procedure of addition of salt, such as sodium chloride or sodium sulphate, called "salting out", then filtered, giving the pasty commercial product of course containing some included salt.

According to the present invention, this solution of methyl violet salt, before salting out, is subjected to extraction with an appropriate solvent material. A large number of solvent materials are available and are here divided into two classes for the purpose of the present invention.

*Class A solvents.*—Those in which the methyl violet salt is practically insoluble: toluene, xylene, diisobutylene, carbon tetrachloride, propylene dichloride, secondary amyl acetate, benzene, solvent naphtha, ethylene dichloride, ortho-dichlorobenzol, mono-chlorbenzol, dibutyl ether, light pine oil, dipropyl ether, and other less common ones.

*Class B solvents.*—Those in which a partial solubility of the methyl violet salt, or hydrolyzed free base, may be effected: methyl-n-butyl ketone, n-butyl alcohol, dichlor ethyl ether, methyl amyl ketone, dipropyl ketone, secondary amyl alcohol, and other less common ones. This group may be used so as to avoid taking commercially appreciable quantities of color substance from the aqueous solution.

In all cases, the solvent is colored by methyl violet or color substance from the mass called methyl violet, but the amount of color substance present is not sufficient to change the definitions above given. In the case of the solvent liquid toluene of the example, dyestuff present in the solvent may be only 0.1% of the original mass. This is considered "practical insolubility" for commercial purposes for Class A solvents. For Class B solvents it is recognized that a larger amount dissolves. Still other solvents, or very large quantities of Class B solvents may be used, with greater loss of color substance. Of course, the amount lost depends upon the choice of solvent, the amount of solvent, the temperature, and other conditions. There is no critical point to limit the invention but only an economic point to limit use of the invention in a practical way, determined by balance of economic advantages and disadvantage. Irrespective of how much methyl violet is dissolved in the solvent liquid, so long as all of it is not extracted, the invention is practiced upon the residue left in aqueous solution, as set forth in the claims.

All of these solvents when used in sufficient quantity will form a separable layer with water and aqueous solutions of the methyl violet salt. Some of these solvents have an appreciable solubility in water, which is less, the lower the temperature, but they can nevertheless be used in sufficient amount to provide the necessary immiscible body of liquid for the extraction. Therefore, in such case, it is preferred to carry out the process in cold, rather than in warm solutions. The lower temperatures may require more water to dissolve all the methyl violet salt, than higher temperatures, but this is no appreciable handicap, because lower temperatures also lessen the solubility of the dyestuff in those solvents tending to dissolve it. Anyone skilled in the art may readily practice the invention by using sufficient water to dissolve the methyl violet salt to be purified, and a sufficient amount of the solvent liquid to form a considerable volume of separable solvent layer, at whatever temperatures the extraction is made.

Some of the solvents are heavier and some lighter than the aqueous solution so that in the resulting two liquid phases the solvent layer may be either above or below the aqueous layer.

The aqueous layer may contain some mechanically included solvent, or some dissolved solvent, which may eventually reside in part in the salted out dyestuff to be provided. Where the odor or the presence of such residual solvent is undesired, it may be readily removed from the solution before salting out by steam-distillation. In some cases it may be readily removed from the paste or dry form of the methyl violet after isolation from the solution.

In carrying out the invention, it is preferred to extract the aqueous solution more than once, using smaller volumes of solvent than would be necessary for the same purification if only one extraction is made. Also the Class A solvents are preferred, and particularly those which are lighter than the aqueous solution and also those most readily volatile for removal by evaporation or with steam as described. Of course, different solvents may be used in succession, and where this is done, it is preferred to use them in the order of least volatile to most volatile, whereby the removed layer of the last takes up residues of the first from the aqueous layer, leaving the most volatile residues for easy removal. The invention practically may be carried out as follows:

*Example I*

A solution of methyl violet salt containing about 5% by weight of the methyl violet salt is treated with 10% to 15% by weight of toluene at a convenient temperature below 100° C. Where the solution is derived from the copper sulphide as described it will ordinarily be the sulphate or chloride salt, and the temperature of the solution will be about 85° C.

The mixed toluene and solution are agitated thoroughly for intimate contact to effect the extraction. On standing the toluene rises to the top and is suitably separated. A second and similar extraction is effected, and this may be repeated a number of times until the desired degree of purity has been attained. Two extractions are usually sufficient.

Steam is then passed through the aqueous solution to remove traces of toluene. The solution is treated with about 5% (based on weight of aqueous solution) sodium chloride or otherwise suitably salted out to render the salt insoluble in the resulting aqueous salt solution. The precipitated dyestuff is filtered off, and used as a paste, or may be dried, preferably at 65° to 75° C. The solid product, either as a paste or as a dry salt, may be boiled in water without emitting any of the customary objectionable odors. The useful product may be the aqueous solution itself after separation of the two phases, as for example where it is to be used for making another product such as a lake color. Whether the methyl violet is isolated as such, or utilized by conversion, the process broadly is considered as recovering methyl violet from the solution, whether it is effected by isolation or by utilization.

The process is not to be considered as limited to or by the example herein given, and various changes and modifications, many of which are herein suggested, are considered as falling within the scope of the invention as defined in the appended claims.

I claim:

1. The process for deodorizing methyl violet which comprises subjecting an aqueous solution of a water-soluble methyl violet salt to the extracting action of a solvent liquid which forms a separable layer with said solution and which is incapable of dissolving all of the methyl violet from the aqueous solution, whereby the said liquid takes up objectionable malodorous bodies from the aqueous solution, and separating the resulting two liquid phases.

2. The process for deodorizing methyl violet which comprises subjecting an aqueous solution of a water-soluble methyl violet salt to the extracting action of a solvent liquid which forms a separable layer with said solution and which is incapable of dissolving all of the methyl violet from the aqueous solution, whereby the said liquid takes up objectionable malodorous bodies from the aqueous solution, separating the resulting two liquid phases, removing traces of said extracting liquid from the aqueous solution, and recovering solid methyl violet from the aqueous solution.

3. The process for deodorizing methyl violet which comprises subjecting an aqueous solution of a water-soluble methyl violet salt to the extracting action of a solvent liquid which forms a separable layer with said solution and which is incapable of dissolving all of the methyl violet from the aqueous solution, whereby the said liquid takes up objectionable malodorous bodies from the aqueous solution, separating the resulting two liquid phases, and recovering solid methyl violet from the aqueous solution.

4. The process for deodorizing methyl violet which comprises subjecting an aqueous solution of a water-soluble methyl violet salt to the extracting action of a volatile solvent liquid which forms a separable layer with said solution and which is incapable of dissolving all of the methyl violet from the aqueous solution, whereby the said liquid takes up objectionable malodorous bodies from the aqueous solution, separating the resulting two liquid phases, and volatilizing residual solvent liquid from the resulting methyl violet.

5. The process for deodorizing methyl violet which comprises subjecting an aqueous solution of a water-soluble methyl violet salt to the extracting action of a solvent liquid which forms a separable layer with said solution and which is a practical non-solvent for methyl violet from the said solution, whereby the said liquid takes up objectionable malodorous bodies from the aqueous solution, and separating the resulting two liquid phases.

6. In the process of manufacturing methyl violet yielding an aqueous solution of methyl violet salt, the steps of subjecting said solution to the extracting action of a solvent liquid which forms a separable layer with said solution and which is incapable of dissolving all of the methyl violet from said solution, and separating the resulting two liquid phases prior to isolation of methyl violet from said solution.

7. In the process of manufacturing methyl violet yielding an aqueous solution of methyl violet salt, the steps of subjecting said solution to the extracting action of toluene, and separating the resulting supernatant layer of toluene from said aqueous solution prior to isolation of methyl violet from said aqueous solution.

8. In the process of manufacturing methyl violet yielding an aqueous solution of methyl violet salt, the steps of subjecting said solution to the extracting action of toluene, separating the resulting supernatant layer of toluene from said aqueous solution, and steam distilling said aqueous solution to remove residual toluene prior to isolation of methyl violet from said aqueous solution.

9. The method of deodorizing commercial methyl violet which comprises dissolving the methyl violet in water in the form of a water-soluble salt, extracting the resulting solution with a solvent liquid which forms a separable layer with said solution and which is incapable of dissolving all of the methyl violet from said solution, separating the two resulting liquid phases, and recovering methyl violet from said solution.

10. The method of deodorizing commercial methyl violet which comprises dissolving the methyl violet in water in the form of a water-soluble salt, extracting the resulting solution with a volatile solvent liquid which forms a separable layer with said solution and which is incapable of dissolving all of the methyl violet from said solution, separating the two resulting liquid phases, volatilizing residual solvent liquid from said solution, and recovering methyl violet from the solution.

ORVILLE S. FRANK.